US009680373B2

(12) United States Patent
Suetake et al.

(10) Patent No.: US 9,680,373 B2
(45) Date of Patent: Jun. 13, 2017

(54) CHARGE PUMP CIRCUIT

(71) Applicant: Mitsubishi Electric Corporation, Tokyo (JP)

(72) Inventors: Naruki Suetake, Tokyo (JP); Takamasa Asai, Tokyo (JP); Kenichi Fujie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 14/650,372

(22) PCT Filed: Apr. 25, 2013

(86) PCT No.: PCT/JP2013/062222
§ 371 (c)(1),
(2) Date: Jun. 8, 2015

(87) PCT Pub. No.: WO2014/174634
PCT Pub. Date: Oct. 30, 2014

(65) Prior Publication Data
US 2015/0318783 A1    Nov. 5, 2015

(51) Int. Cl.
*H02M 3/07*    (2006.01)
(52) U.S. Cl.
CPC ..................... *H02M 3/07* (2013.01)
(58) Field of Classification Search
CPC ....................................... H02M 3/07

USPC ......................................................... 307/405
See application file for complete search history.

(56) References Cited

U.S. PATENT DOCUMENTS

2003/0156439 A1    8/2003    Ohmichi et al.
2007/0090775 A1    4/2007    Ribarich

FOREIGN PATENT DOCUMENTS

| JP | 10-155270 A | 6/1998 |
| JP | 2003-244966 A | 8/2003 |
| JP | 2004-129413 A | 4/2004 |

OTHER PUBLICATIONS

Communication dated Nov. 28, 2016, from the European Patent Office in counterpart European Application No. 13882851.2.
International Search Report for PCT/JP2013/062222 dated Jul. 9, 2013 [PCT/ISA/210].

*Primary Examiner* — Robert Deberadinis
(74) *Attorney, Agent, or Firm* — Sughrue Mion, PLLC; Richard C. Turner

(57) ABSTRACT

The present invention has: a pump capacitor (12), which has one end thereof connected to the source power supply (B) side via a diode (7), and which has the other end thereof connected to two kinds of voltage sources via switches (3, 4); and an output capacitor (13), which has one end there of connected to a high-potential terminal of a pump capacitor via a diode (8), and the other end thereof connected to a source power supply. A filter circuit configured with a resistor (15) and a capacitor (11) is provided between the source power supply and the diode (7).

4 Claims, 3 Drawing Sheets

CHARGE PUMP CIRCUIT

CROSS REFERENCE TO RELATED APPLICATIONS

This application is a National Stage of International Application No. PCT/JP2013/062222, filed on Apr. 25, 2013, the contents of all of which are incorporated herein by reference in their entirety.

TECHNICAL FIELD

The present invention relates to a means for supplying a control voltage to a switching device that applies energization control to a multiphase motor or the like and more particular to a charge pump circuit that steps up a power-source voltage so as to generate a stepped-up voltage.

BACKGROUND ART

In order to be normally turned on, an N-ch MOS switching device that applies energization control to a multiphase motor requires a gate voltage the same as or a predetermined value higher than the source voltage.

In this situation, a charge pump circuit is known; in order to obtain a high voltage, the charge pump circuit steps up a power-source voltage so as to obtain a stepped-up voltage.

In an electronic device mounted in a vehicle, it is required to suppress electromagnetic noise such as radio noise; in general, radio noise is produced at a timing of a change, in a current consumption, that is caused when a semiconductor switch is turned on or off, and the noise level is liable to rise in proportion to the steepness of a current change.

FIG. 3 illustrates the configuration of an ordinary charge pump circuit; when a switch (SW3) 3 is turned off and a switch (SW4) 4 is turned on, a pump capacitor (C2) 12 is charged with a current supplied from a B terminal of a source power supply via a diode (D1) 7; when the switch (SW3) 3 is turned on and the switch (SW4) 4 is turned off, the electric charge stored in the pump capacitor (C2) 12 is discharged to a tank capacitor (CU) 13 via the diode (D2) 8.

Because due to the operation of the charge pump circuit, the current from the B terminal steeply changes, the level of radio noise rises.

For example, Patent Document 1 discloses an invention in which a filter is provided between a charge pump circuit and a power source so that switching noise is eliminated.

PRIOR ART REFERENCE

Patent Document

Patent Document 1: Japanese Patent Application Laid-Open No. H10-155270

DISCLOSURE OF THE INVENTION

Problems to be Solved by the Invention

Patent Document 1 discloses that a filter is provided in a power supply line of a charge pump circuit; however, the circuit configuration of the charge pump circuit is not disclosed.

FIG. 4 illustrates a circuit diagram of a charge pump circuit inferred from Patent Document 1; the tank capacitor (CU) 13 is connected with a point after a filter that follows a power supply line and is configured with a resistor (Ri) 15 and a capacitor (Ci).

In this situation, because due to the operation of the charge pump, the electric potential of the point after the filter does not stabilize, the reference electric potential of the tank capacitor (CU) 13 does not stabilize; thus, the output of the charge pump may not stabilize, either. In FIG. 4, constituent elements with reference characters the same as those in FIG. 3 denote the same or similar constituent elements.

In addition, when the tank capacitor (CU) 13 is connected to the GND, the foregoing problem can be solved; however, it is required to select a capacitor having a high withstanding voltage.

The present invention has been implemented in order to solve the foregoing problems; the objective thereof is to provide a charge pump circuit that is inexpensively configured, that can suppress or eliminate switching noise, and that can reduce or eliminate radio noise.

Means for Solving the Problems

A charge pump circuit according to the present invention includes a pump capacitor whose one end is connected with a source power supply side via a first reverse-current prevention element so that a charging current is supplied thereto and whose other end is connected with two kinds of voltage sources via switches and an output capacitor whose one end is connected with a high-potential terminal of the pump capacitor via a second reverse-current prevention element so that a charging current from the pump capacitor is supplied thereto via the second reverse-current prevention element and whose other end is connected with the source power supply; in the charge pump circuit, a filter circuit configured with a resistor and a capacitor is provided between the source power supply and the first reverse-current prevention element, and the connection point of the resistor and the capacitor of the filter circuit and one end of the first reverse-current prevention element are connected with each other.

Advantage of the Invention

A charge pump circuit according to the present invention makes it possible to suppress or eliminate switching noise caused by the charge pump circuit and to reduce or eliminate radio noise.

The foregoing and other object, features, aspects, and advantages of the present invention will become more apparent from the following detailed description of the present invention when taken in conjunction with the accompanying drawings.

BEST MODE FOR CARRYING OUT THE INVENTION

Figure 1:
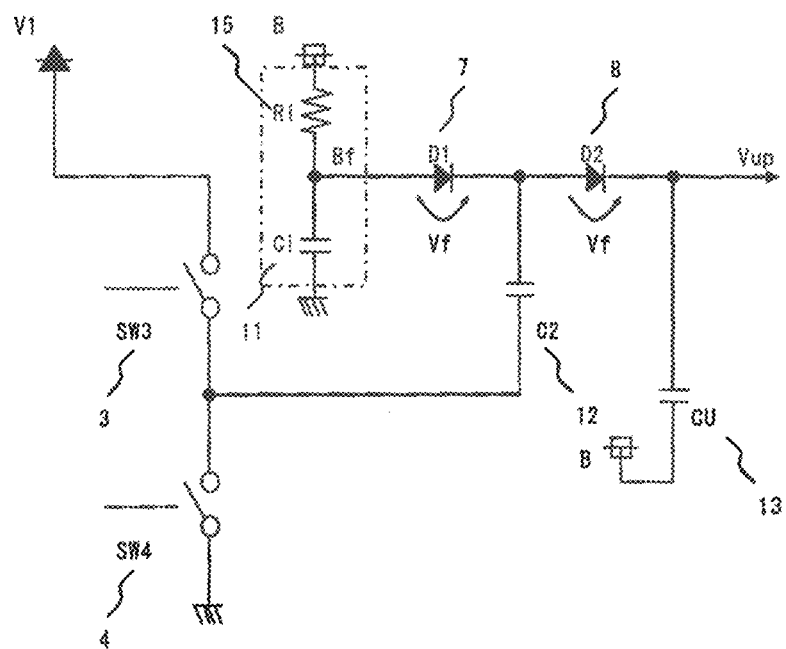
FIG. 1 is a circuit diagram of a charge pump circuit according to Embodiment 1 of the present invention.

Hereinafter, embodiments of charge pump circuits according to the present invention will be explained with reference to the drawings. In each of the drawings, the same reference characters denote the same or similar constituent elements.

Embodiment 1

FIG. 1 is a diagram the circuit configuration of a charge pump circuit according to Embodiment 1. In FIG. 1, at first, a capacitor (Ci) 11 is charged with a current supplied from a source power supply B line through a resistor (Ri) 15 of a filter circuit configured with the resistor (Ri) 15 and the capacitor (Ci) 11 that are connected in series with each other.

When in this situation, a switch (SW3) 3 is turned off and a switch (SW4) 4 is turned on, electric charges move from the capacitor (Ci) 11 to a pump capacitor (C2) 12 via a diode (D1) 7 (hereinafter, also referred to simply as a diode 7), which is a first reverse-current prevention element, so that the pump capacitor (C2) 12 is charged up to Bf-Vf. Here, Bf and Vf denote an electric potential of the capacitor (Ci) 11 and a voltage drop across the diode 7, respectively.

This operation is referred to as Phase 1.

After that, when the switch (SW3) 3 is turned on and the switch (SW4) 4 is turned off, the pump capacitor (C2) 12 is connected with a voltage source V1; the electric charges move from the pump capacitor (C2) 12 to an output capacitor (CU) 13 via a diode (D2) 8 (hereinafter, also referred to simply as a diode 8), which is a second reverse-current prevention element, so that the output capacitor (CU) 13 is charged up to Bf+V-2 Vf. Here, V and 2 Vf denote an electric potential of the voltage source V1 and a voltage drop across the diodes 7 and 8, respectively.

This operation is referred to as Phase 2.

In Phase 1, because the supply source of electric charges for the pump capacitor (C2) 12 is the capacitor (Ci) 11, no steep current change occurs in the source power supply B line. In addition, the contributing factor of noise is a steep current change or a steep voltage change; however, according to the present configuration, no steep current change occurs in the source power supply B line, as described above; thus, the noise level of the source power supply B line is lowered or the noise is eliminated.

It is only necessary that the capacity of the capacitor (Ci) 11 is set to be enough to refuel electric current to be consumed through the pump capacitor (C2) 12; therefore, the capacity of the capacitor (Ci) 11 can be set to be smaller as the capacity of the pump capacitor (C2) 12 is smaller or as the operating frequency of the charge pump is lower.

Because the low-voltage side of the output capacitor (CU) 13 is connected with the source power supply B line, the electric potential difference across the output capacitor (CU) 13 is only the voltage to which the output capacitor (CU) 13 is charged by the charge pump; thus, it is not required to raise the withstanding voltage.

Embodiment 2

Figure 2:
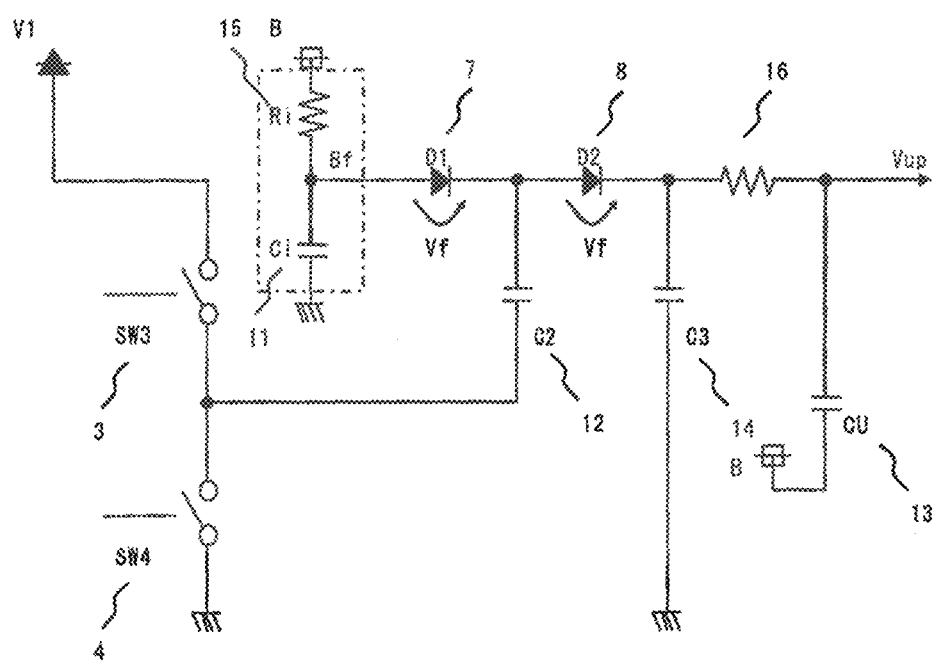
FIG. 2 is a circuit diagram of a charge pump circuit according to Embodiment 2 of the present invention.

FIG. 2 is a diagram illustrating the circuit configuration of charge pump circuit according to Embodiment 2 of the present invention. In FIG. 2, at first, the capacitor (Ci) 11 (hereinafter, also referred to simply as a capacitor 11) is charged with a current supplied from a source power supply B line through the resistor (Ri) 15 (hereinafter, also referred to simply as a resistor 15) in the filter circuit configured with the resistor (Ri) 15 and the capacitor (Ci) 11 that are connected in series with each other.

When in this situation, the switch (SW3) 3 (hereinafter, also referred to simply as a switch 3) is turned off and a switch (SW4) 4 (hereinafter, also referred to simply as a switch 4) is turned on, electric charges move from the capacitor 11 to the pump capacitor (C2) 12 via the diode (D1) 7 (hereinafter, also referred to simply as a diode 7), which is the first reverse-current prevention element, so that the pump capacitor (C2) 12 is charged up to Bf-Vf. Here, Bf and Vf denote an electric potential of the capacitor 11 and a voltage drop across the diode 7, respectively.

This operation is referred to as Phase 1.

After that, when the switch 3 is turned on and the switch 4 is turned off, the pump capacitor (C2) 12 is connected with the voltage source V1; electric charges move from the pump capacitor (C2) 12 to a capacitor (C3) 14, which is a temporary charge storage means, via the diode 8; then, the output capacitor (CU) 13 is charged up to Bf+V-2 Vf via a resistor 16. Here, V and 2 Vf denote an electric potential of the voltage source V1 and a voltage drop across the diodes 7 and 8, respectively.

This operation is referred to as Phase 2.

Also in Embodiment 2, in Phase 1, because the supply source of electric charges for the pump capacitor (C2) 12 is the capacitor 11, no steep current change occurs in the source power supply B line. In addition, the contributing factor of noise is a steep current change or a steep voltage change; however, according to the present configuration, no steep current change occurs in the source power supply B line, as described above; thus, the noise level of the source power supply B line is lowered or the noise is eliminated.

Moreover, in Phase 2, when moving to the output capacitor (CU) 13, the electric charges are stored in the capacitor (C3) 14, which is a temporary charge storage means; therefore, no steep change occurs in the current to the output capacitor (CU) 13.

Accordingly, when the electric charges move to the output capacitor (CU) 13, the current moves thereto on a path independent from the source power supply B line; therefore, no steep current change occurs in the source power supply B line and hence the noise level of the source power supply B line can be lowered or the noise can be eliminated.

Figure 3:
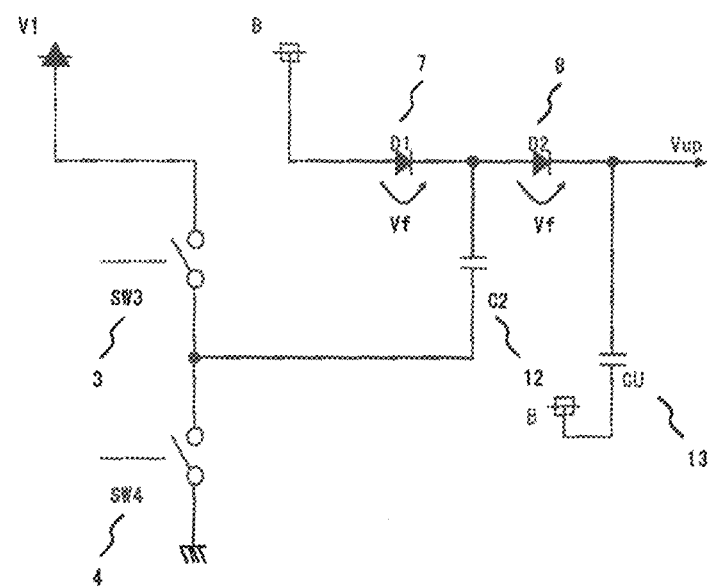
FIG. 3 is a circuit diagram illustrating an example of ordinary charge pump circuit.
Figure 4:
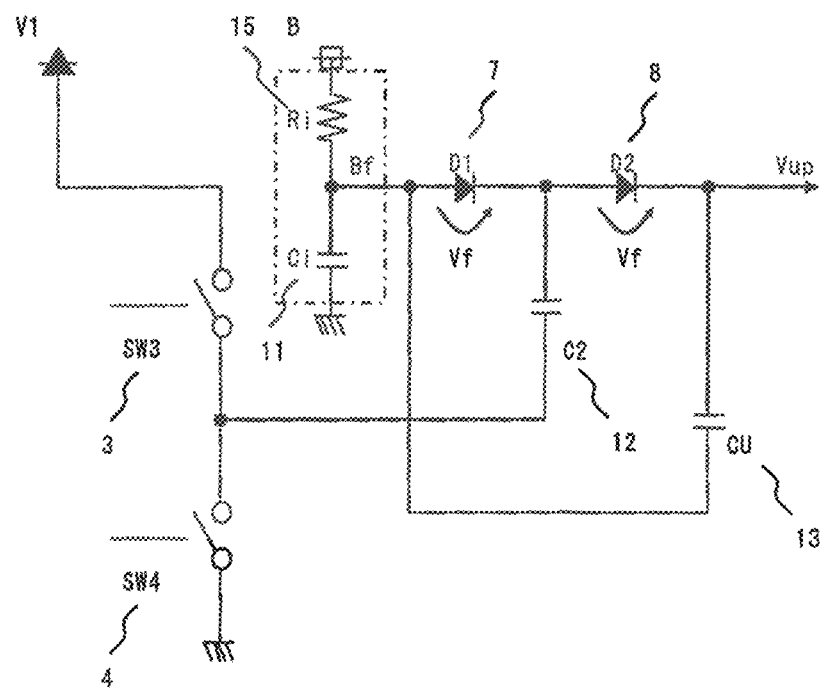
FIG. 4 is a circuit diagram illustrating another example of conventional charge pump circuit.
Figure 5:
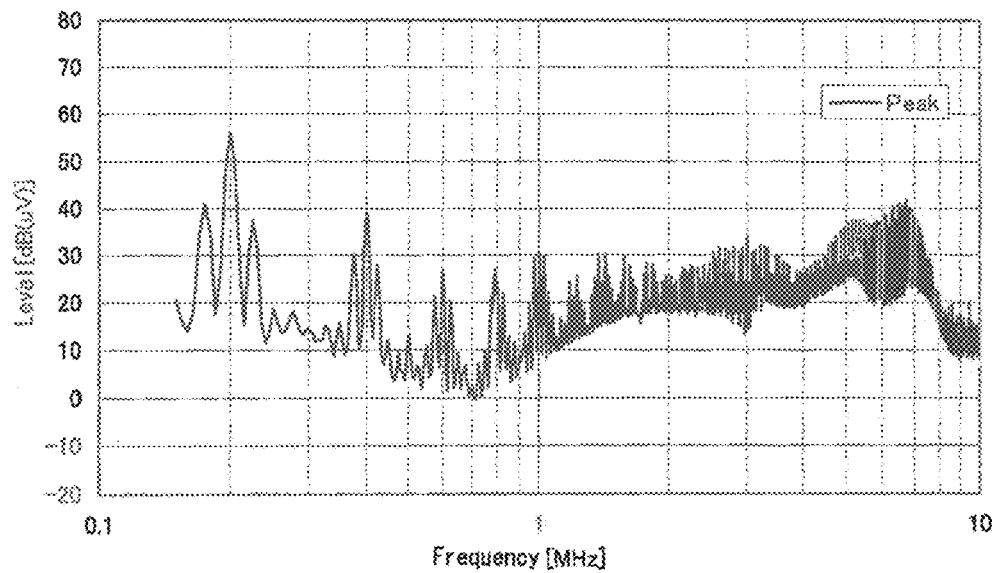
FIG. 5 is a graph representing a noise level of the charge pump circuit in FIG. 3.

FIG. 5 is a graph representing a noise level of the conventional charge pump circuit in FIG. 3.

Because the operating frequency of the charge pump circuit is 200 kHz, the noise levels at 200 kHz and the integral-multiple frequencies thereof in FIG. 3 are large.

Figure 6:
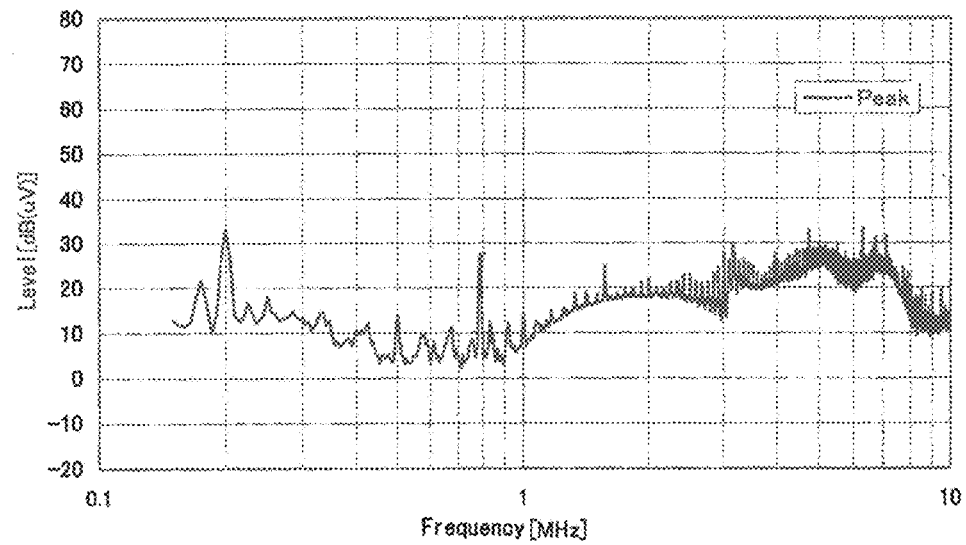
FIG. 6 is a graph representing a noise level of the charge pump circuit in FIG. 2.

In Contrast, FIG. 6 is a graph representing a noise level of the charge pump circuit according to Embodiment 2 of the present invention.

As evident from FIGS. 5 and 6, in the case where the operating frequency of the charge pump circuit is 200 kHz, the noise level of the charge pump circuit according to Embodiment 2 is lowered by approximately 23 dBµV in comparison with the noise level of the conventional charge pump circuit, and the noise levels at the integral-multiple frequencies thereof are also lowered by approximately 30 dBµV.

As explained heretofore, a charge pump circuit according to the present invention makes it possible to suppress or eliminate switching noise caused by a charge pump and to reduce or eliminate radio noise with a simple configuration.

INDUSTRIAL APPLICABILITY

As a control voltage supply means for a semiconductor switching device mounted in a vehicle and as a charge pump circuit for setting up a power-source voltage so as to produce a stepped-up voltage, the present invention is useful.

DESCRIPTION OF REFERENCE NUMERALS

1, 2: switch
7, 8: diode
11: capacitor
12: pump capacitor
13: output capacitor
14: capacitor (charge storage means)
15, 16: resistor

The invention claimed is:

1. A charge pump circuit comprising:
a pump capacitor whose one end is connected with a source power supply side via a first reverse-current prevention element so that a charging current is supplied thereto and whose other end is connected with two kinds of voltage sources via switches; and
an output capacitor whose one end is connected with a high-potential terminal of the pump capacitor via a second reverse-current prevention element so that a charging current from the pump capacitor is supplied thereto via the second reverse-current prevention element and whose other end is connected with the source power supply, wherein a filter circuit configured with a resistor and a capacitor is provided between the source power supply and the first reverse-current prevention element, and the connection point of the resistor and the capacitor of the filter circuit and one end of the first reverse-current prevention element are connected with each other.

2. The charge pump circuit according to claim 1, wherein a charge storage means is provided between the second reverse-current prevention element and a high-potential terminal of the output capacitor.

3. The charge pump circuit according to claim 1, wherein the capacity of the capacitor of the filter circuit is determined based on a switching frequency and the capacity of the pump capacitor.

4. The charge pump circuit according to claim 2, wherein the capacity of the capacitor of the filter circuit is determined based on a switching frequency and the capacity of the pump capacitor.

* * * * *